March 2, 1965 T. E. ELLIS 3,171,899

SELECTOR CIRCUIT

Filed March 7, 1962 2 Sheets-Sheet 1

INVENTOR.
THOMAS E. ELLIS

BY George W. Killian

AGENT

United States Patent Office 3,171,899
Patented Mar. 2, 1965

3,171,899
SELECTOR CIRCUIT

Thomas E. Ellis, Rochester, N.Y., assignor to General Dynamics Corporation, Rochester, N.Y., a corporation of Delaware Filed Mar. 7, 1962, Ser. No. 178,035
3 Claims. (Cl. 179—18)

Figure 1:
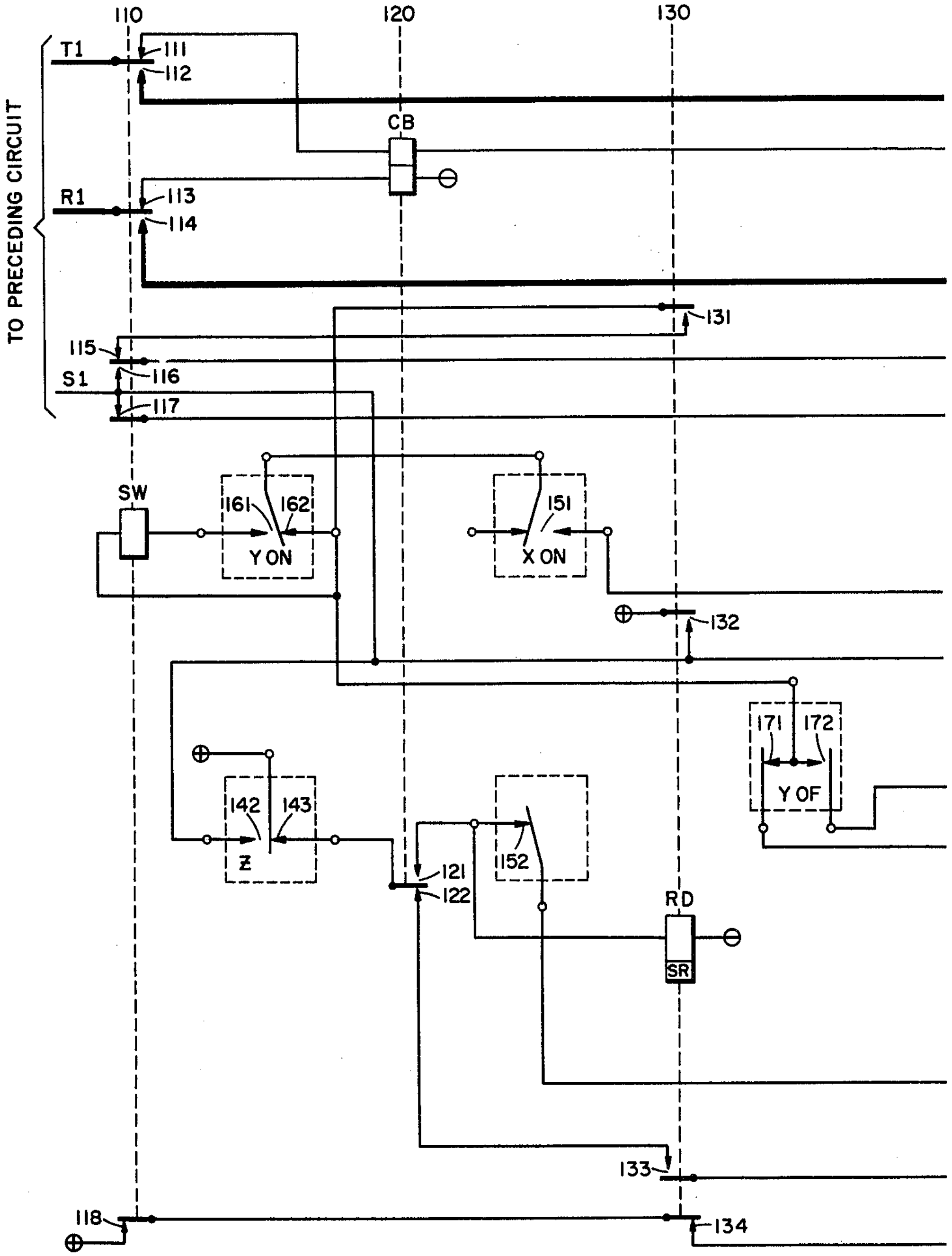

This invention relates in general to automatic telephone systems and, more particularly, to selector circuits used in automatic step-by-step telephone systems.

Although the invention herein disclosed is suitable for more general application, it is particularly adapted for use in automatic telephone systems of the step-by-step type. In such systems, circuits known as selectors are frequently used. A selector circuit may be defined as a switching circuit comprising a switching mechansm activated by incoming signals for selecting a predetermined group of trunks. After the termination of the incoming signals, the selector mechanism automatically hunts for and switches through to an idle one of the trunks in the predetermined group. As is well known to those skilled in the step-by-step telephone art, the typical electromechanical switch mechanism associated with a selector is provided with a set of wipers which may be advanced step-by-step to any of ten levels and thereafter advanced by an automatic hunting operation over ten steps to hunt for an idle one of the trunks connected to the individual steps. If no idle trunks are found, the switching mechanism will take an eleventh step to a terminal which is customarily designated as an "overflow" terminal and busy tone will be returned to the calling subscriber. That is, with conventional switching mechanisms, a selector can only look at ten trunks within a group in an effort to find an idle trunk although the group may actually include more than ten trunks. In order to reduce the probability of a selector reporting an all trunks busy condition when, in fact, there are idle trunks, the trunks are usually graded in a manner such that although a given selector can only test ten of the trunks within the group, the probability of all ten of these trunks being busy when, in fact, there are idle trunks within the group which are not accessible to said given selector, is very small. Very briefly, grading is accomplished by providing different first-choice outgoing trunks and common last-choice trunks. Thus, since it may be assumed that traffic is originated on a random basis, the probability is very great that when one of the selectors finally seizes a last-choice outgoing trunk, all the first-choice trunks are also busy.

Since the facilities for providing for grading require a substantial amount of space, grading facilities are not usually provided in a telephone exchange unless such facilities are actually required or their requirement is anticipated. In a telephone exchange wherein grading facilities were not provided and the traffic has grown to such an extent that it is desirable to add grading facilities, it is a time consuming and expensive proposition to add the grading facilities. Or in a telephone exchange wherein grading facilities are not originally required but might be anticipated in one or more trunk groups, an economic determination of the advisability of adding the grading facilities must be made. In such marginal systems, a substantial savings could be made if it were possible to expand the trunk group to eleven trunks, rather than the conventional limit of ten trunks, thereby obviating the need to add grading facilities.

It is, therefore, a general object of this invention to provide a new and improved selector circuit.

It is a more particular object of this invention to provide a new and improved selector circuit which provides for access to an outgoing trunk circuit on the overflow terminals.

It is another object of this invention to provide a new and improved selector circuit which can switch through to an overflow trunk when the overflow trunk is idle and which can return busy tone to the calling subscriber when the overflow trunk is busy.

It is another object of this invention to provide a selector circuit which provides facilities for the associated switching mechanism to test one more outgoing trunk circuit than the switching mechanism could otherwise have tested.

In accordance with the present invention, a conventional selector circuit is provided with an additional relay. The additional relay may be selectively operated when the selector is dialed to predetermined levels. The operation of this relay allows the sleeve wiper of the selector switch to test the overflow terminals for the busy or idle condition of an eleventh trunk connected to the overflow terminals. When the overflow trunk is busy, ground is returned on the sleeve and a busy signal is returned to the calling subscriber. When the overflow trunk is idle, the selector switches through to the overflow terminal which is then marked as busy to prevent any other selectors from switching through to it. In the illustrated embodiment of the invention, the additional relay added to the selector circuit is a differential relay which is differentially energized when the selector advances to the overflow terminals and the overflow trunk is busy. However, it would be possible to use different types of relays in this application or to use a plurality of relays.

Further objects and advantages of the invention will become apparent as the following description proceeds, and features of novelty which characterize the invention will be pointed out in particularity in the claims annexed to end forming a part of this specification.

For a better understanding of the invention, reference may be had to the accompanying drawings which should be arranged in successive order from left to right to show the invention.

Figure 2:
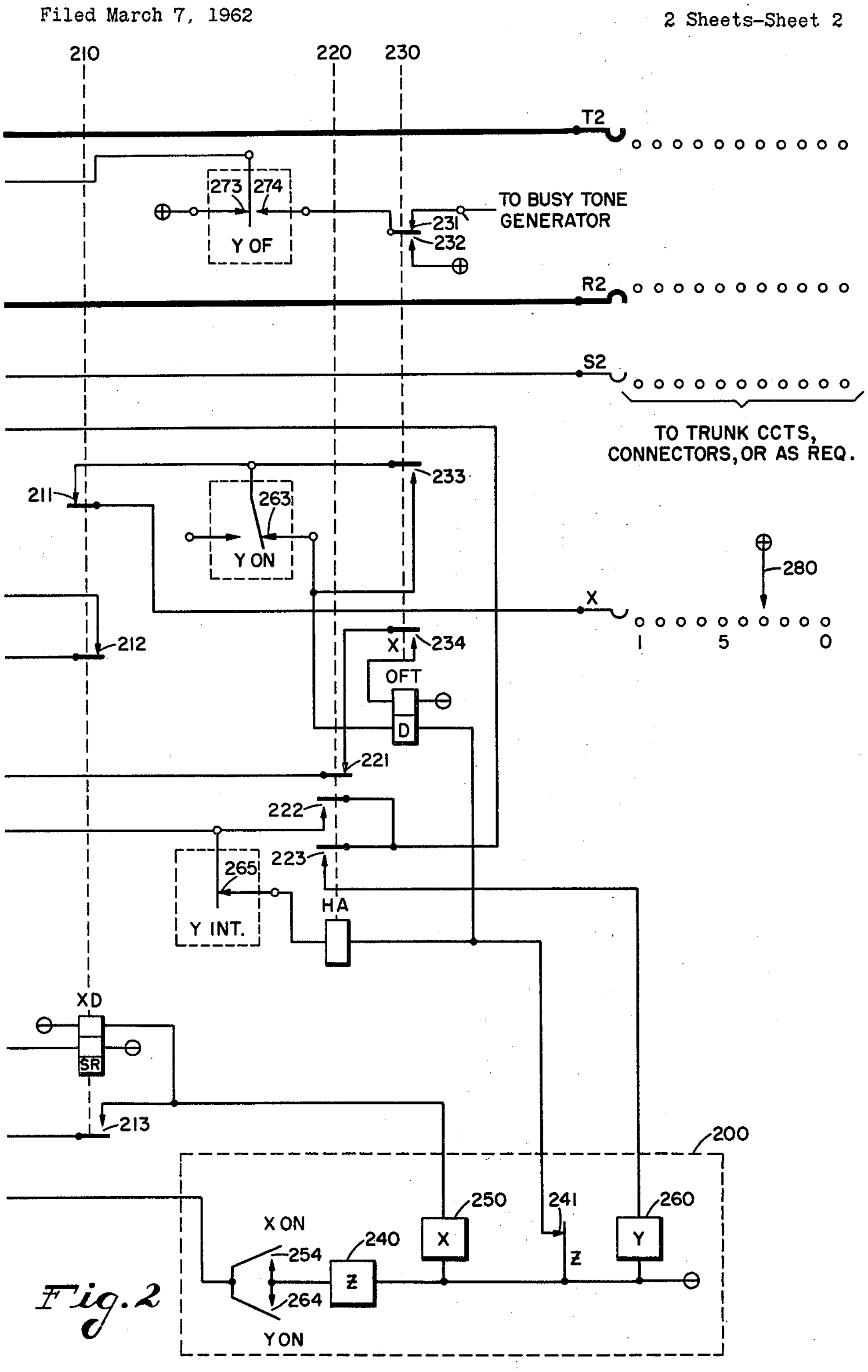

FIGS. 1 and 2 show the details of the selector circuit.

It should be understood that only the details of the circuit necessary to understand the invention have been shown. For example, ancillary features such as digit adding and digit canceling as well as various supervisory and alarm features which do not form a part of this invention are not shown.

As is well known to those skilled in the telephone art, circuits of this nature are conventionally powered from a direct current power supply. For convenience and in accordance with telephone terminology, all terminals connected to the negative potential of the D.C. power supply are designed minus (−) and are hereinafter referred to as "battery"; and all terminals connected to the positive potential of the D.C. power supply are designated plus (+) and are hereinafter referred to as "ground." The various components of the two-motion step-by-step electromechanical switch which is associated with the selector circuit are shown in detached contact form. That is, the various contacts and components associated with the switch are illustrated in the most convenient part of the drawing rather than being collected together. For easy identification, the various parts are illustrated in dashed rectangles and are individually identified. For example, contacts associated with the switch which operate as the switch moves off-normal in its primary direction, hereinafter referred to as the X-direction, are designated X ON (X-off-normal). In a similar manner, contacts which operate when the switch moves off-normal in its secondary direction, hereinafter referred to as the Y-direction, are designated Y ON (Y-off-normal). In addition to these contacts, there are Y OF (Y-overflow) contacts which operate as the switch advances to the overflow position.

The contacts designated Y INT (Y-interrupter) are normally closed contacts which open each time the Y-magnet, which drives the switch in the Y-direction, operates. In addition to the aforementioned contacts associated with the switch, there is another group of contacts designated Z. These contacts operate when the Z-magnet (release magnet) operates to restore the switch to its home position. All switch and relay contacts are, of course, drawn in their normal condition. That is, with all relays released and the switch in its home position.

It is believed that the operation of the system can best be understood from the following detailed description.

DETAILED DECRIPTION

The selector circuit shown in FIGS. 1 and 2 illustrates the invention using a conventional selector circuit comprising a two-motion switch 200, a calling bridge relay 120, a release delay relay 130, an X-direction relay 210, a hunt assist relay 220, a switchthrough relay 110, and an overflow trunk relay 230. The two-motion switch 200 includes an X-motor magnet 250 for driving the switch step-by-step in the X-direction, a Y-motor magnet 260 for driving the switch step-by-step in the Y-direction, and a Z or release magnet 240 for restoring the switch to its normal position. Switch wipers T2, R2 and S2 are advanced first in the X-direction and then into wire banks in the Y-direction, while wiper X moves only in the X-direction. The various off-normal contacts associated with the switch have already been mentioned. It should be noted that the RD relay 130 and XD relay 210 are both slow-release relays as indicated by the designation SR at the bottom of the rectangle indicating the relay coils. The OFT relay 230 is a differential relay as indicated by the letter D in the bottom of the box indicating that relay coil. That is, when the two windings of relay 230 are energized, the windings produce equal and opposite magnetic flux, thereby preventing the relay from operating, or releasing it if it was operated. The lead designated GBT in FIG. 2 is a grounded busy tone signal lead.

The selector circuit of FIGS. 1 and 2 may be seized when the preceding circuit closes a D.C. loop between leads T1 and R1 to operate CB relay 120 from battery through the lower winding of relay 120, contacts 113, lead R1, the D.C. loop, lead T1, contacts 111, the upper winding of relay 120, and Y OF contacts 273 to ground. The operation of relay 120 opens contacts 122 and closes contacts 121 to connect ground through contacts 143 and 121 to energize and operate relay 130. The same ground that operates relay 130 is applied through X ON contacts 152 to operate relay 210. The operation of relay 130 closes contacts 132 to apply ground to lead S1 to mark this circuit as busy and to apply a holding ground, if required, to the preceding circuit.

In response to dialing impulses from the preceding circuit, the pulsing relay 120 releases and reoperates a number of times corresponding to the digit dialed. Each release of relay 120 closes contacts 122 to forward ground from contacts 143 through contacts 133 and 213 to the X-motor magnet 250 and battery. Each closure of this circuit energizes the X-magnet 250 to drive the wipers of the switch one step in the X-direction. Each reoperation of relay 120 reapplies ground to relay 130 which, because of its slow-release characteristic, remains operated during pulsing. As the switch takes its first step in the X-direction, the operating circuit to the lower winding of relay 210 is opened; however, it remains operated during pulsing because of its slow-release characteristic and because its upper winding is energized in parallel with X-magnet 250 during each step.

Upon completion of the first digit, relay 120 remains operated, thereby holding relay 130 operated through contacts 121. Relay 210 releases since the circuit to its lower winding is opened at X ON contacts 152, which opened as the switch took its first step in the X-direction.

By the action described above, the wipers of the selector switch have been advanced to the desired level and the circuitry now automatically carries out its selecting function. More specifically, the circuitry causes the switch to hunt for an idle one of the outgoing circuits to which it has access in the selected level. The hunting action is initiated by the closure of contacts 212 of XD relay 210 which forwards ground from contacts 132 through X ON contacts 151, Y ON contacts 162, Y OF contacts 171, and Y-interrupter contacts 265 to the winding of HA relay coil 220. The other terminal of relay coil 220 is connected via contacts 241 to battery. Relay 220 operates and locks itself operated under control of the Y-interrupter 265. The locking circuit is from battery through contacts 241 and relay coil 220, Y-interrupter contacts 265, relay contacts 222, 117 and 132 to ground. The same ground that holds relay 220 operated is forwarded through operated contacts 223 to battery connected Y-motor magnet 260 which causes the switch to take its first step in the Y-direction. Near the end of the stroke of the Y-magnet armature, the Y-interrupter contacts 265 open to release relay 220 which, in turn, opens the circuit to the Y-motor magnet, releasing it. If the first-choice outgoing trunk is busy, wiper S2 encounters a ground on the first wire bank terminal which is forwarded through contacts 115, 131, 171 and 265 to reoperate relay 220. Relay 220, as before, causes the Y-motor magnet 260 to be energized, thereby causing the switch to take another step in the Y-direction. It should be noted that the circuit which first energized relay 220 is not effective for subsequent operations of relay 220 inasmuch as the circuit included Y ON contacts 162 which opened as the switch took its first step in the Y-direction. The switch takes an additional step in the Y-direction each time sleeve wiper S2 encounters a ground.

After the switch takes its first step in the Y-direction, it will be observed that ground from contacts 132 is forwarded through contacts 212, X ON contacts 151, Y-off-normal contacts 161, to the right-hand terminal of relay 110, and that the left-hand terminal of relay 110 is also connected to ground as long as sleeve wiper S2 is at ground potential. Therefore, as long as the sleeve wiper S2 continues to encounter a ground potential, relay 110 is effectively shunted and prevented from operating. However, when sleeve wiper S2 advances to a terminal which is not grounded, the shunt on relay 110 is removed and relay 110 operates in series with relay 220. Relay 220 does not operate inasmuch as the resistance of relay 110 is relatively high and reduces the current in the circuit to such an extent that relay 220 cannot operate. The circuit for operating relay 110 is from ground at contacts 132 through contacts 212, X ON contacts 151, Y ON contacts 161, the relay coil 110, Y OF contacts 171, Y INT contacts 265, the resistance of relay coil 220, and contacts 241 to battery. The operation of relay 110 opens contacts 111, 113, 115, 117 and 118 and closes contacts 112, 114 and 116. The closure of contacts 112, 114 and 116. The closure of contacts 112, 114 and 116 switch through the T1, R1 and S1 leads to wipers T2, R2 and S2, respectively. The succeeding circuit, when seized by the D.C. loop across leads T1 and R1, returns a ground to wiper S2 which is forwarded through closed contacts 116, 212, 151 and 161 to hold relay 110. The opening of contacts 111 and 113 opens the circuit to relay 120 which releases and opens contacts 121, thereby opening the circuit to relay 130 which releases at the end of its release delay time.

The foregoing description describes a normal operation of this selector circuit when it finds an idle outgoing circuit before the switch has stepped to its Y-overflow position.

*Operation of the circuit when relay OFT is not used and all outgoing trunks are busy*

In the event that relay 230 is not used and all the outgoing trunks are busy, the T2, R2 and S2 wipers will be driven to an eleventh, or overflow position. As the wipers advance to the overflow position, the Y OF contacts 171 and 273 will open and contacts 172 and 274 will close. The opening of Y OF contacts 171 opens the circuit to relay 220, thereby preventing its reoperation and thereby terminating the hunting action of the circuit. The closure of Y OF contacts 274 forwards grounded busy tone to the preceding circuit.

*Operation of the circuit when relay OFT is used and the first ten outgoing trunks are busy.*

In situations wherein the normal ten outgoing trunks are not adequate to serve the traffic, an eleventh outgoing trunk may be added. Levels that are equipped with an eleventh, or overflow trunk, are marked by having ground potential 280 applied to the appropriate X-wire bank, or banks. Therefore, when a level is dialed that is equipped with an overflow trunk, ground 280 will be forwarded from the X-wiper through contacts 211, when relay 210 releases at the end of the X-digit, and Y ON contacts 263 to the lower winding of overflow trunk relay 230 which is connected to battery through contacts 241. Relay 230 operates and closes contacts 233 which shunt Y ON contacts 263, thereby providing a holding circuit for relay 230.

The remaining operation of the circuit will proceed as previously described up to the time when the switch is advanced to its Y-overflow position. When the switch advances to the Y-overflow position, a determination must be made whether the overflow trunk is busy or idle. If the overflow trunk is idle, the selector should switch through to it and if the overflow trunk is busy, the selector should return busy tone.

*Circuit operation when the overflow trunk is busy*

When the overflow trunk is busy, the sleeve wiper S2 encounters a ground, which is forwarded through contacts 115, 131, Y OF contacts 172, contacts 221 and 234 to the upper winding of overflow trunk relay 230. This energizes both windings of the overflow trunk relay 230 and, since the relay is differentially connected, the magnetic fluxes created by the two windings cancel each other and the relay releases. Contacts 234 of relay 230 are preliminary make contacts, as indicated by the designation X. The use of preliminary make contacts assures that relay 230 will be completely released when it is differentially energized. With relay 230 released, the circuit will be in the same condition as was previously described when the switch advanced to Y-overflow and all the trunks were busy. Therefore, busy tone will be returned to the preceding circuit.

*Circuit operation when the overflow trunk is idle*

When the overflow trunk is idle, the sleeve wiper S2 does not encounter a ground and, therefore, the overflow trunk relay 230 does not become differentially energized and does not release. The fact that the sleeve wiper S2 does not encounter a ground will unshunt relay 110 which operates in series with the upper winding of overflow trunk relay 230. The circuit for operating relay 110 is from ground at contacts 132, through contacts 212, 151, 161, the winding of relay 110, Y-overflow contacts 172, contacts 221 and 234 to battery at the upper winding of relay 230. The relatively high resistance of the winding of relay 110 reduces the current through the upper winding of overflow trunk relay 230 to such an extent that, although the relay is differentially energized, the relay does not release because of the substantial difference in the amount of magnetic flux created by the two windings. The operation of relay 110 causes the T1, R1 and S1 leads to switch through to the T2, R2 and S2 wipers, respectively, in the same manner as previously described. Also after the operation of relay 110, relays 120 and 130 release in the manner previously described. Therefore, after switch through to an overflow trunk, the only relays remaining operated are relays 110 and 230.

This selector is released when the succeeding circuit removes ground from lead S2 to release relay 110. The release of relay 110 closes contacts 118 to forward ground to the battery connected release magnet 240. The operation of release magnet 240 causes the switch 200 to restore to normal and when the X ON contacts 254 and Y ON contacts 264 open, the circuit to the release magnet is opened.

While there has been shown and described one embodiment of a selector which may be provided with overflow trunks, other embodiments will readily occur to those skilled in the art. For example, two conventional relays might be substituted for differential relay 230, or other types of relays, such as bistable relays, might be used. It is not desired, therefore, that the invention be limited to the embodiment shown and described, and it is intended to cover in the appended claims all such modifications as fall within the true spirit and scope of the invention.

What is claimed is:

1. A selector device for extending a connection from a preceding circuit to an idle one of a group of N succeeding circuits, where N is a plural integer, said selector device including a stepping switch having a normal position and N different operated positions for extending a connection from said selector device to a separate one of said N succeeding circuits in each and every one of said respective operated positions, only an idle one of said succeeding circuits returning a first marking condition to said selector circuit when a connection has been extended thereto and only a busy one of said succeeding circuits returning a second marking condition to said selector device when a connection has been extended thereto stepping control means for stepping said switch from any position thereof to the next position thereof in response to an operating signal being applied thereto, first coupling means responsive to said switch being in its normal position for applying said operating signal to said stepping control means, normally unoperated overflow contact means coupled to said switch means which are operated only in response to said switch having been stepped to its Nth operated position, second coupling means responsive to both said contact means being unoperated and the return of said second marking condition for applying an operating signal to said stepping control means, normally unoperated switchthrough means for connecting said preceding circuit to said extended connection in response to the operation thereof, third coupling means responsive only to the return of said first marking condition for operating said switchthrough means, busy-indicating means independent of said switchthrough means for returning a busy-indicating signal to said preceding circuit in response to a given signal applied thereto, and fourth coupling means responsive to both said contact means being operated and the return of said second marking condition for applying said given signal to said busy-indicating means.

2. The selector device defined in claim 1, wherein said stepping control means includes a relay having a winding one side thereof which has a first given potential applied thereto, wherein said busy-indicating means includes a relay having a winding one side thereof which has said first given potential applied thereto, wherein said switchthrough means includes a relay having a winding one side thereof which has a second given potential applied thereto, a predetermined potential difference existing between said first and second given potentials, wherein said second marking condition is the presence of a marking potential equal to said second given potential on a conductor of said selector device which marking potential is applied to said conductor from a busy succeeding circuit through said switch and said first marking condition is the absence of said marking potential on said conductor, wherein said second coupling means includes means for connecting said conductor to the other side of said winding of said relay of said control stepping means only when said contact means are unoperated, wherein said fourth coupling means includes means for connecting said conductor to said other side of said winding of said relay of said busy-indicating means only when said contact means are operated, and wherein said third coupling means includes means for connecting said conductor to the other side of said winding of said relay of said switchthrough means, the operating current for said relay of said switchthrough means being substantially less than the operating current for said relays of said control stepping means and said busy-indicating means, respectively.

3. The selector device defined in claim 2, wherein said switch is a two-directional switch which may first be stepped in a first direction to select any one of a plurality of levels and then be stepped a second direction to any of N operated positions within any selected level, said group of N circuits corresponding to a predetermined level of said switch, wherein said relay of said busy-indicating means is a differential relay including a second winding in addition to said first-mentioned winding and normally closed contacts for returning said busy indication signal to said preceding circuit in response to said overflow contact means being operated, and further including means responsive to directive signals applied to said device from said preceding circuit to step said switch in said first direction to a level manifested by said directive signals, said first coupling means being normally ineffective and being rendered effective in response to the completion of said stepping by said switch in said first direction, and means selectively controlled by said switch having been stepped in said first direction to said predetermined level for applying a signal to said second winding of said differential relay of said busy-indicating means to effect the operation thereof, whereby said normally closed contacts thereof are opened in response to said switch being stepped to said predetermined level, said differential relay of said busy-indicating means restoring to effect the reclosure of said normally closed contacts in response to the application of said given signal to said first-mentioned winding thereof.

References Cited by the Examiner

UNITED STATES PATENTS

| | | | |
|---|---|---|---|
| 1,809,882 | 6/31 | Wright | 179—18 |
| 1,886,613 | 11/32 | Wicks | 179—18 |
| 2,660,619 | 11/53 | Kessler | 179—18 |
| 2,800,533 | 7/57 | Lomax | 179—18 |

ROBERT H. ROSE, *Primary Examiner.*